Patented Dec. 19, 1939

2,183,933

UNITED STATES PATENT OFFICE 2,183,933

PROCESS OF PREPARING DIETARY ANTIRACHITIC SUBSTANCES

James Knox Elderkin, Montclair, and Emil Hofman, Newark, N. J., assignors to Chemical Products Company of New Jersey, Inc.

No Drawing. Application October 8, 1937, Serial No. 168,010

3 Claims. (Cl. 99—13)

This invention relates to a process of preparing dietary substances so they will possess antirachitic properties which will cure or prevent rickets.

It has heretofore been proposed to treat substances or some one element thereof with ultraviolet rays such as are comprised in a light emanating from a quartz mercury vapor lamp. Certain patents directed to this method of producing vitamin D generally known as the antirachitic vitamin, are as follows: U. S. Patents 1,680,818, issued August 14, 1928; and 1,871,136, issued August 9, 1932, to Harry Steenbock. These patents point out now various organic substances, having medicinal or food value for both man and animals, can be treated with ultra-violet rays to produce in the substances or some one substance included in the food content, the antirachitic vitamin which acts to prevent or cure rachitis or, as more commonly known, rickets.

From the tests and investigations which we have made, we have found that by treating dietary substances or some one substance or element making up a food compound, with ozone, a gas chemically represented by the symbol $O_3$, the vitamin D potency is greatly increased over the same substances treated according to the process of said Steenbock patents.

In the preparation of dietary substances, either in solid or liquid form, it is many times preferable to make a concentrate containing a substantial quantity of antirachitic vitamin, which may be mixed with other substances or food products, either in solid or liquid form.

It is generally accepted that the unsaponifiable part of fats consists largely of sterols, chief among which are cholesterol, present in animal fats, and phytosterol, present in vegetable oils. Cholesterol, the best known, occurs also in the brains, skin and blood. A third sterol, ergosterol, somewhat similar to cholesterol, can be extracted from fungi, yeast, mushrooms and especially from ergot. Ergosterol is also found in cholesterol.

We have found that when cholesterol, and more particularly ergosterol, is subjected to the effects of ozone, it becomes antirachitically active, so that elements or substances like these are very useful in making an activating concentrate material which can be mixed with other edible substances.

We do not deem it necessary to go into a general description of the manner of attaining suitable lipoids or equivalent substances, as this is old and well known. Furthermore, the several methods of preparing ozone are also old and well known, and the method of application to or treatment of the dietary substances or elements making up a compound may be varied over a wide range. For example, in the treatment of milk, the milk may be sprayed into a chamber within which ozone is present or through which ozone is passed, producing therein what we believe to be a chemical change, and giving to the milk a vitamin D potency greatly in excess of that derived from the standard ultra-violet ray treatment. For instance, in the treatment of milk, it will be readily understood by one skilled in these matters that the spraying operation, including the amount of milk sprayed or passing through the chamber in a given time, will require different amounts of ozone, the treatment, however, being limited so as to avoid harmful injury to the antirachitic vitamin in the milk.

When we refer to a "substance", we do not necessarily mean a single food article, but a plurality of articles such as corn, wheat, rye, oats and the like may be mixed as a ration for animals. Similarly, a ration may be compounded for human consumption. Consequently, in the interpretation of the appended claims, we do not wish to be unduly restricted.

What we claim is:

1. The process of preparing dietary substances so they will possess antirachitic properties which consists in subjecting at least some part of the substance to the action of only ozone for a period sufficient to effect antirachitic activation, but limited so as to avoid harmful injury to the antirachitic vitamin.

2. The process of preparing dietary substances so they will possess antirachitic properties which consists in subjecting, for a predetermined time, in the absence of light rays within the ultraviolet band, a suitable activatable material, to ozone which is capable of developing therein said antirachitic properties, but limiting the action so as to avoid subsequent harmful injury to the antirachitic properties established in the material.

3. The process of imparting antirachitic properties to dietary substances which consists in subjecting, for a predetermined time, the substance to be treated to the action of ozone for a period sufficient to effect antirachitic activation, but so limited as to avoid subsequent substantial injury to the antirachitic properties established by the process.

JAMES KNOX ELDERKIN.
EMIL HOFMAN.